(12) United States Patent
Moon

(10) Patent No.: US 10,743,965 B2
(45) Date of Patent: Aug. 18, 2020

(54) PALATAL EXPANSION APPLIANCE

(71) Applicant: Sung Chul Moon, Seoul (KR)

(72) Inventor: Sung Chul Moon, Seoul (KR)

(73) Assignee: Sung Chul Moon, Seoul (KR)

( * ) Notice: Subject to any disclaimer, the term of this patent is extended or adjusted under 35 U.S.C. 154(b) by 10 days.

(21) Appl. No.: 15/781,625

(22) PCT Filed: May 9, 2016

(86) PCT No.: PCT/KR2016/004811
§ 371 (c)(1),
(2) Date: Jun. 5, 2018

(87) PCT Pub. No.: WO2017/104913
PCT Pub. Date: Jun. 22, 2017

(65) Prior Publication Data
US 2018/0368945 A1    Dec. 27, 2018

(30) Foreign Application Priority Data

Dec. 15, 2015    (KR) .................. 10-2015-0179210
Mar. 31, 2016    (KR) .................. 10-2016-0039625

(51) Int. Cl.
*A61C 7/10*    (2006.01)
*A61C 7/02*    (2006.01)

(52) U.S. Cl.
CPC . *A61C 7/10* (2013.01); *A61C 7/02* (2013.01)

(58) Field of Classification Search
CPC ............ A61C 7/10; A61C 7/02; A61C 8/0096; A61B 17/66–666
USPC ......................................................... 433/7
See application file for complete search history.

(56) References Cited

U.S. PATENT DOCUMENTS

| | | | | |
|---|---|---|---|---|
| 3,977,082 | A | * | 8/1976 | Siatkowski .............. A61C 7/10 433/7 |
| 5,902,304 | A | * | 5/1999 | Walker ................. A61B 17/663 606/282 |
| 6,328,745 | B1 | | 12/2001 | Ascherman |
| 2001/0036614 | A1 | | 11/2001 | Farzin-Nia et al. |
| 2003/0039581 | A1 | | 2/2003 | DeLuke |
| 2003/0049581 | A1 | | 3/2003 | Deluke |

(Continued)

FOREIGN PATENT DOCUMENTS

| | | |
|---|---|---|
| RU | 70789 U1 | 2/2008 |
| WO | 2008/011698 A2 | 1/2008 |

(Continued)

OTHER PUBLICATIONS

Russian Search Report and English Translation for Application No. 2018120341/14(032056), dated Feb. 28, 2019, 4 pages.

(Continued)

*Primary Examiner* — Sean M Michalski
*Assistant Examiner* — Shannel N Wright
(74) *Attorney, Agent, or Firm* — Burris Law, PLLC

(57) ABSTRACT

A palatal expansion appliance includes one pair of bone screw joints arranged to face each other, each of the one pair of bone screw joints extending in one direction and having a plurality of bone screw holes formed thereon, and a driving portion arranged between the one pair of bone screw joints, in which, as at least a part of the driving portion is moved in one direction, the one pair of bone screw joints are moved in another direction.

24 Claims, 11 Drawing Sheets

(56) References Cited

U.S. PATENT DOCUMENTS

| | | | |
|---|---|---|---|
| 2008/0003535 A1* | 1/2008 | Williams | A61C 7/10 433/7 |
| 2009/0130620 A1 | 5/2009 | Yazdi | |
| 2010/0004691 A1* | 1/2010 | Amato | A61B 17/1728 606/280 |
| 2011/0143300 A1* | 6/2011 | Villaalba | A61C 7/10 433/7 |
| 2011/0236847 A1 | 9/2011 | Hang | |
| 2012/0277749 A1* | 11/2012 | Mootien | A61B 17/663 606/70 |
| 2013/0122446 A1* | 5/2013 | Lee | A61C 7/00 433/8 |
| 2013/0189640 A1* | 7/2013 | Kook | A61C 8/0031 433/18 |
| 2013/0252195 A1 | 9/2013 | Popat | |
| 2015/0024334 A1* | 1/2015 | Montalban | A61C 7/10 433/7 |
| 2016/0270884 A1* | 9/2016 | Yousefian | A61C 7/10 |

FOREIGN PATENT DOCUMENTS

| | | | |
|---|---|---|---|
| WO | WO-2008011698 A2 * | 1/2008 | A61C 7/10 |
| WO | 2010/018266 A1 | 2/2010 | |
| WO | WO-2012023736 A2 * | 2/2012 | A61C 7/22 |

OTHER PUBLICATIONS

Russian Office Action and English Translation for Application No. 2018120341/14(032056), dated Feb. 28, 2019, 12 pages.

Examination Report from the Australian Application No. 2016372936, dated Jul. 27, 2018.

Extended European Search Report for Application No. 16875855.5, dated Jan. 16, 2019 (7 pages).

KR 10-2016-0039625 Korean Office Action and English translation dated Jun. 7, 2017, 6 pages.

KR 10-2016-0039625 Office Action dated Sep. 5, 2017.

International Search Report for PCT/KR2016/004811 dated Sep. 12, 2016.

Written Opinion of International Searching Authority for PCT/KR2016/004811 dated Sep. 12, 2016 (9 pages).

International Preliminary Report on Patentability for PCT/KR2016/004811 dated Dec. 17, 2017 (4 pages).

* cited by examiner

PALATAL EXPANSION APPLIANCE

TECHNICAL FIELD

The present invention relates to a palatal expansion appliance, and more particularly, to a palatal expansion appliance which may expand a palate without applying force to teeth.

BACKGROUND ART

Palatal expansion appliances have long been used to expand a width of a narrow palate in a treatment process of malocclusions in dental clinics and are also used in the field of otorhinolaryngology to improve nasal breathing impairment and/or obstructive sleep apnea.

Hereinafter, the structure and operating principle of palatal expansion appliances that have been generally used to date are briefly described.

FIG. 1 schematically illustrates a palatal expansion appliance 10 according to the related art.

Referring to FIG. 1, the palatal expansion appliance 10 may include a screw rod 12, a pair of bodies 13, a pair of guide rods 14, two pair of tooth connecting rods 15, and a key 16.

The screw rod 12 has threads of two types respectively formed at one end portion and the other end portion thereof in opposite directions.

The screw rod 12 may include a keyhole formation portion 11 at a center portion thereof. A user inserts the key 16 into a keyhole kh and rotates the screw rod 12.

A plurality of keyholes kh are formed at a constant interval around the keyhole formation portion 11. For example, a total of two keyholes kh may be formed at an interval of 90° around the keyhole formation portion 11. The two keyholes kh may perpendicularly penetrate through the keyhole formation portion 11.

Each of the bodies 13 is coupled to the guide rods 14 which penetrate through the each of the bodies 13, and each of the bodies 13 is screw-coupled to the screw rod 12 to be moved along the guide rods 14 in a coupled state. In other words, each of the bodies 13 may include a part functioning as a nut. Each of the tooth connecting rods 15 is coupled to each of the bodies 13. Accordingly, each of the tooth connecting rods 15 transfers a force to teeth T of FIG. 2A, in which the force is generated as each of the bodies 13 moves. For example, each of the tooth connecting rods 15 is welded on each of the bodies 13.

Each of the guide rods 14 is coupled to the bodies 13 by penetrating therethrough, and stably guides each of the bodies 13 in an expansion direction according to rotations of the screw rod 12.

The key 16 may include a holding part 16a and an insertion part 16b.

When the user holding the holding part 16a of the key 16 inserts the insertion part 16b into the keyhole kh and applies a force in a direction indicated by an arrow, the keyhole formation portion 11 rotates in the direction indicated by the arrow and accordingly the screw rod 12 rotates in the same direction as a rotation direction of the keyhole formation portion 11. In this state, each of the bodies 13 screw-coupled to the screw rod 12 moves in a direction away from the center of the keyhole formation portion 11. Accordingly, each of the tooth connecting rods 15 coupled to each of the bodies 13, for example, by welding, is moved in the direction away from the center of the keyhole formation portion 11 with each of the bodies 13.

FIG. 2A is a plan view illustrating a state in which the palatal expansion appliance 10 of FIG. 1 is installed around a palate PT or a roof of the mouth. FIG. 2B is a side view illustrating a state in which the palatal expansion appliance 10 of FIG. 1 is installed around the palate PT or the roof of the mouth. In FIG. 2A, the palatal expansion appliance 10 is arranged to be symmetrical to the left and right with respect to a median palatine suture (MPS). Each of the tooth connecting rods 15 of the palatal expansion appliance 10 is attached, for example, welded, to a band b encompassing the teeth T.

In the palatal expansion appliance 10 of FIG. 1, as a user rotates the keyhole formation portion 11 to rotate the screw rod 12, when each of the bodies 13 is moved, as illustrated in FIG. 2A, each of the tooth connecting rods 15 is moved in the direction indicated by the arrow, thereby transferring a force to the teeth T. The force transferred to the teeth T is re-transferred to the MPS via a gum bone (not shown) where the teeth T are implanted, so that the MPS is widened to the left and right. In the MPS widened as above, a bone is grown at a widened portion after about three months and the widened MPS is stably restored, thereby expanding the width of the palate PT.

The palatal expansion appliance 10 having the above structure and operation according to the related art, as described above, transfers a force to the teeth T at both sides, in particular, molar teeth at both sides, to apply the force to the MPS that is a target tissue to expand. In this state, if the MPS is not smoothly widened because resistance of the MPS is stronger than an expansion force, as illustrated in FIGS. 2B and 3, only molar teeth (MT) at both sides are inclined outwardly due to the expansion force. Accordingly, the initial treatment objective of widening a narrow palate may not be achieved, resulting in a failure of the treatment. The problem arises often particularly in the case of adults in which the MPS has already hardened, compared to adolescents in a growth phase. Accordingly, in the case of adults, in order to successfully expand a narrow palate, with the use of the palatal expansion appliance 10, a considerable operation may need to be performed on an upper jaw bone and the palate PT to reduce resistance of peripheral tissues, which may financially and physically burden a patient.

To prevent such a failure, there have been various trials to change the design of a palatal expansion appliance to transfer the expansion force of an appliance "fixed to both molar teeth (tooth-borne)" to the MPS. However, in the case of adults, the trials have obtained no great effect due to the resistance of the MPS that has already hardened, aside from the design of an appliance.

Accordingly, recently, there has been an increase in trials to directly apply a force to the MPS that is a target tissue to expand, not via the teeth, by directly fixing a palatal expansion appliance to bones around the MPS (bone-borne).

An example of such a trial includes a palatal expansion appliance 20 illustrated in FIG. 5A.

Referring to FIG. 5A, the palatal expansion appliance 20 may include a keyhole formation portion 21, a screw rod 22 having threads of two types formed on one end portion and another end portion thereof in opposite directions, a pair of bodies 23, a pair of guide rods 24, two pairs of tooth connecting rods 25, four bone screw holes 26, four bone screws 27, and a key (not shown, same as the key 16 of FIG. 1) for rotating the keyhole formation portion 21. Since each of the bone screws 27 is implanted into bone, the bone screws 27 are referred to as "bone screws".

The palatal expansion appliance 20 of FIG. 5A is different from the palatal expansion appliance 10 of FIG. 1 in that the bodies 23 are provided with the bone screw holes 26 so that the expansion force may be directly transferred to an adjacent bone of the MPS by the bone screws 27, in addition to the teeth T. Portions of the palatal expansion appliance 20 of FIG. 5A that are not described below are considered to be identical to the portions of the palatal expansion appliance 10 of FIG. 1.

The screw rod 22 may include the keyhole formation portion 21 at the center portion thereof. A plurality of keyholes kh are formed at a certain interval around the keyhole formation portion 21.

Each of the bone screw holes 26 is formed at upper and lower sides of each of the bodies 23 in a direction perpendicular to a direction in which the palatal expansion appliance 20 expands. In detail, each of the bone screw holes 26 is formed at one end portion or another end portion of each of the bodies 23 in a lengthwise direction thereof.

An operating principle of the palatal expansion appliance 20 of FIG. 5A is similar to that of the palatal expansion appliance 10 of FIG. 1. As illustrated in FIG. 5B, the palatal expansion appliance 20 is installed on the teeth T. In detail, after bending each of the tooth connecting rods 25 corresponding to the shape of a palate so as to be fixed to the teeth T, a tooth band b encompassing the teeth T and corresponding to the shape of the teeth T is attached to the teeth T. Since the tooth connecting rods 25 and the tooth band b are welded to each other, a plaster mold is manufactured by making a negative imprint of the shape of a mouth of a patient using a dental impression material, the positions of the palatal expansion appliance 20 and the tooth band b are reproduced in the plaster mold and then the tooth connecting rods 25 and the tooth band b are welded to each other. The palatal expansion appliance 20 in the state in which the tooth band b is welded to the tooth connecting rods 25 is installed in the mouth of a patient by coating the tooth band b with a dental adhesive to fix the tooth band b to the teeth of a patient. Then, surface anesthesia and local anesthesia are performed on soft tissues and mucous membrane around the four bone screw holes 26 formed on the bodies 23 of the palatal expansion appliance 20. Next, each of the bone screws 27 is implanted into a bone through each of the bone screw holes 26. Also, as a result, the palatal expansion appliance 20 is fixed to each palatal bone and the teeth T. Next, when the keyhole formation portion 21 is rotated in one direction, each of the bone screws 27 implanted in the bone and each of the tooth connecting rods 25 connected to the teeth T via the tooth band b are moved in directions away from each other, that is, in directions in which the MPS expands. Accordingly, as the forces are transferred to the MPS via the teeth T and a gum bone into which the teeth T are implanted, and via the bone screws 27 implanted in the adjacent bone of the MPS, the MPS is widened. In other words, the palatal expansion appliance 20 described above is an appliance obtained by modifying the (tooth-borne) palatal expansion appliance dependent on teeth according to the related art, by which the expansion force is additionally applied to the bone through the four bone screws 27 implanted into the four bone screw holes 26 formed at the upper and lower ends of the bodies 23 of the palatal expansion appliance 20 in the lengthwise direction.

Although the above-described appliance that applies forces to the bone adjacent to the MPS together with the teeth is an improvement to reduce failure of the (tooth-borne) palatal expansion appliance according to the related art that applies a force to the teeth only, the appliance still has the following problems.

1) The palatal expansion appliance (see FIGS. 1, 2A, and 2B) has a width of the appliance itself for the screw rod, the guide rod, and the body needed to widen the appliance. No matter how wide the body expands, the screw rod and the guide rod inserted into the body should partially remain in the body to maintain firm coupling between parts of the appliances. Accordingly, assuming that the width of the palatal expansion appliance is 100%, an expandable width is limited to about 70% of the width of the appliance. However, as the width of a palate decreases, a wider expansion of the palate is needed to achieve an appropriate treatment object. In other words, although a palatal expansion appliance having a wider operation range for expansion is needed as a width of the palate decreases, a wide palatal expansion appliance may not be used for a narrow palate. In other words, it is difficult to use a palatal expansion appliance having a sufficient operation range for widening a palate with a palate having a relatively narrow width.

2) According to a recent change in a treatment method, bone screws are implanted into bones adjacent to the MPS to directly apply a force to the MPS, a portion having an appropriate thickness enduring an expansion force in the adjacent bones is located within a 3 mm offset to the left and right from a center line of the median palatine suture (see FIG. 4). Accordingly, considering the shape of the palatal expansion appliance according to the related art, the positions where the bone screws are implantable into bones within a 3 mm offset to the left and right from the center line of the median palatine suture through the bone screw holes formed in the bodies are only four positions at the upper and lower sides of each of the bodies in the lengthwise direction of the bodies.

However, when the bone screws 27 are implanted at four positions only vertically in the lengthwise direction of the bodies of the palatal expansion appliance 20, if just one of the four bone screws 27 is loose with respect to the bone, the other bone screws 27 may not stably sustain the expansion force. In detail, when one of the four bone screws 27 is loose, it becomes difficult for the bone screw 27 located at the same side as the bone screw 27 that is loose to solely sustain the expansion force, and thus the coupling with the bone becomes loose within a short period of time. In other words, since the force needs to be uniformly transferred to the opposite portions that expand in order to have normal expansion, when only two bone screws 27 are provided at each side, if only one bone screw 27 is loose, it is difficult to stably perform the function of sustaining the expansion force. This is similar to a case in which, although an automobile having four wheels seems to be stable, if one of the wheels has a problem, it is difficult to stably perform a function. Accordingly, in order to reduce a bone screw failure risk in which the overall function of the appliance is deteriorated according to the failure of the bone screw, it is advantageous to implant three or more bone screws at each side.

3) When the palate to expand is very narrow, due to the width of the palatal expansion appliance 20 itself, it is difficult to fix the palatal expansion appliance 20 by using the bone screws 27 in a state in which the bodies of the appliance closely contact the palate, that is, the bone screw holes formed in the body sufficiently closely contact the palate (see FIG. 5C). In this state, as a lever arm between a point where the expansion force is generated by the screw rods 22 and a bone portion fixed by the bone screws 27 increases, a twisting force applied to the bone screws 27 increases so that the bone screws 27 may be highly likely to be taken off. In the present specification, the "lever arm" denotes a distance between a point where a force is generated and a point of action where the force acts.

4) Accordingly, in the "bone-borne" palatal expansion appliance 20 used in the case of adults having a harder MPS compared to that of adolescents, as illustrated in FIGS. 5B and 5C, to prepare for a case in which the bone screws 27 are loose, each of the tooth connecting rods 25 is fixed to the teeth T or the molar teeth MT by using the teeth band b. However, in order to fix the palatal expansion appliance 20 to the teeth T in the existing manner as described above, a patient needs to visit a hospital several times to manufacture a separate plaster mold and weld the palatal expansion appliance 20 to the plaster mold and reposition the palatal expansion appliance 20 in the mouth of the patient, the size of the appliance 20 increases such that eating food and managing oral hygiene are much inconvenienced. When the bone screws 27 are loose and lost, the teeth T finally receive the force and thus the teeth T are inclined outwardly and twisted, which is the disadvantage of the "(tooth-borne) palatal expansion appliance" of the related art.

5) When the palatal expansion appliance is wider than a narrow palate to the left and right, the body of the palatal expansion appliance does not completely fit to soft tissues of the palate in a lower side, the lever arm between the screw rods where the expansion force is generated and the bone screw insertion part increase as described above and thus the bone screw may not stably sustain the expansion force. Also, to reduce the above phenomenon, clinically, the palatal expansion appliance is arranged to be as close as possible to the palate and fixed thereto by using the bone screws. In this process, a certain part of the palatal expansion appliance excessively presses soft tissues of the palate and thus inflammation and pain may be highly likely to be generated.

6) In all palatal expansion appliances according to the related arts, in order to insert a key into a keyhole formed to rotate the keyhole formation portion, after accurately aiming at an inlet of the keyhole, the key should be inserted in the keyhole in a direction parallel to a direction of the keyhole key so that the key may be successfully inserted in the keyhole. Accordingly, an assistant trained with a method of effectively rotating the keyhole formation portion using the key is needed. The assistant needs to have a certain degree of understanding and proficiency about the structure and function of the palatal expansion appliance. However, a patient living alone may not find such an assistant and, even if an assistant is found, but the assistant lacks a degree of understanding and proficiency about the palatal expansion appliance, successful use of the palatal expansion appliance may not be guaranteed.

DETAILED DESCRIPTION OF THE INVENTIVE CONCEPT

Technical Problem

The present inventive concept provides a palatal expansion appliance which may expand a palate without applying a force to teeth.

Technical Solution

According to an aspect of the present inventive concept, there is provided a palatal expansion appliance includes one pair of bone screw joints arranged to face each other, each of the one pair of bone screw joints extending in one direction and having a plurality of bone screw holes formed thereon, and a driving portion arranged between the one pair of bone screw joints, in which, as at least a part of the driving portion is moved in one direction, the one pair of bone screw joints are moved in another direction.

As the at least a part of the driving portion is moved in the one direction, the one pair of bone screw joints may be moved in a horizontal direction.

The palatal expansion appliance may further include a plurality of bone screws coupled to a corresponding one of the one pair of bone screw joints.

The plurality of bone screw holes may be arranged linearly and spaced apart from each other in a direction in which a corresponding one of the one pair of bone screw joints extends.

A corresponding one of the one pair of bone screw joints may have an arch-shaped bottom part having a thickness that is relatively thick at a center portion of the arch-shaped bottom part and decreases toward opposite end portions of the arch-shaped bottom part in a lengthwise direction of the bone screw joint.

Each of the one pair of bone screw joints may have a tapered protrusion at a bottom side.

Each of the plurality of bone screw holes may have a tapered exit-side external structure.

The palatal expansion appliance may further include an accessory or apparatus used to move a tooth or an upper jaw bone.

The driving portion may move the one pair of bone screw joints such that a gap between the one pair of bone screw joints at one side is greater than a gap between the one pair of bone screw joints at another side.

The driving portion may be manually driven or motor-driven.

The driving portion may include a screw rod arranged between the one pair of bone screw joints to be parallel with the one pair of bone screw joints and having threads of two types respectively formed at one end portion and another end portion of the screw rod in opposite directions, one pair of link joints respectively screw-coupled to the threads of two types formed on the screw rod, and at least one pair of links, each of the one pair of links having one end portion pivotably coupled to a corresponding one of the one pair of link joints and the other end portion pivotably coupled to a corresponding one of the one pair of bone screw joints.

An angle between each of the one pair of links and the screw rod may be variable in a range of about 0°~90°.

The screw rod may include a keyhole formation portion located between the one end portion and the other end portion of the screw rod, and a plurality of keyholes may be formed around the keyhole formation portion at a constant interval.

The plurality of keyholes may be formed around the keyhole formation portion at an interval of about 90°.

Each of the plurality of keyholes may have an inlet which is funnel shaped.

The palatal expansion appliance may further include a key rotating the keyhole formation portion, in which the key is inserted into each of the plurality of keyholes and rotates the keyhole formation portion in one direction.

The palatal expansion appliance may be configured such that, when the keyhole formation portion is rotated in a rotation direction the screw rod is rotated in the same direction as a rotation direction of the keyhole formation portion, the one pair of link joints are moved in a direction toward or away from a center of the keyhole formation portion, each of the one pair of links pivots in a direction in which an angle with respect to the screw rod increases, and each of the one pair of bone screw joints is moved in a direction perpendicular to a lengthwise direction of the screw rod, away from the screw rod.

Centers of the screw rod and the one pair of link joints may be located on a first horizontal plane, and the one pair of bone screw joints may be entirely located on a second horizontal plane that is lower than the first horizontal plane.

The driving portion may move the one pair of bone screw joints such that a gap between the one pair of bone screw joints at one side is greater than a gap between the one pair of bone screw joints at another side.

The driving portion may include a guide rod arranged between the one pair of bone screw joints to be parallel with the one pair of bone screw joints, one pair of link joints respectively coupled to one end portion and another end portion of the guide rod, a motor coupled to the guide rod and comprising a motor drive shaft, a rotating wheel coupled to the motor drive shaft, one pair of wires, each of the one pair of wires having one end portion coupled to a corresponding one of the one pair of link joints and another end portion movably coupled to the rotating wheel, and at least one pair of links, each of the at least one pair of links having one end portion pivotably coupled to a corresponding one of the one pair of the link joints and another end portion pivotably coupled to a corresponding one of the one pair of bone screw joints.

The palatal expansion appliance may be configured such that, when the rotating wheel is rotated in a rotation direction by a rotation force of the motor drive shaft, each of the one pair of wires is wound around the rotating wheel and moved toward the rotating wheel, the one pair of link joints are moved in directions toward or away from each other, each of the at least one pair of links pivots in a direction in which an angle with respect to each of the one pair of wires increases, and each of the one pair of bone screw joints is moved in a direction perpendicular to a lengthwise direction of the guide rod, away from the guide rod.

The driving portion may further include an additional rotating wheel coupled to the motor drive shaft, and one pair of additional wires, each of the one pair of additional wires having one end portion coupled to a corresponding one of the one pair of link joints and another end portion movably coupled to the additional rotating wheel.

At least one of the rotating wheel and the additional rotating wheel may include one pair of sub rotating wheels having different diameters, each of the one pair of wires or the one pair of additional wires may include one end portion coupled to a corresponding one of the one pair of link joints and the other end portion movably coupled to a corresponding one of the one pair of sub rotating wheels, and the driving portion may move the one pair of bone screw joints such that a gap between the one pair of bone screw joints at one side is greater than a gap between the one pair of bone screw joints at another side.

The driving portion may include a motor arranged between the one pair of bone screw joints and comprising a motor drive shaft, a rotating gear coupled to the motor drive shaft, one pair of linear motion units arranged between the one pair of bone screw joints to be parallel with the one pair of bone screw joints, having gear teeth formed at one side in opposite directions, and gear-coupled to the rotating gear, and at least one pair of links, each of the one pair of links having one end portion pivotably coupled to each of the one pair of linear motion units and another end portion pivotably coupled to a corresponding one of the one pair of bone screw joints.

The palatal expansion appliance may be configured such that, when the rotating gear is rotated in a rotation direction by a rotation force of the motor drive shaft, the one pair of linear motion units are moved in a direction toward or away from the motor, each of the one pair of links pivots in a direction in which an angle with respect to a corresponding one of the one pair of linear motion units increases, and each of the one pair of bone screw joints is moved in a direction perpendicular to a lengthwise direction of the linear motion units, away from the linear motion units.

In the driving portion, the rotating gear may include one pair of sub rotating gears having different gear ratios, the one pair of linear motion units are respectively gear-coupled to each of the one pair of sub rotating gears, and the driving portion may move the one pair of bone screw joints such that a gap between the one pair of bone screw joints at one side is greater than a gap between the one pair of bone screw joints at another side.

Advantageous Effects

A palatal expansion appliance according to the present inventive concept has merits as follows.

1) Since the width of the appliance is sufficiently narrow, the appliance may be easily used for even a narrow palate. In detail, the width of the appliance may be designed to be sufficiently narrow (have a width less than or equal to 6 mm) to fix the appliance on bones within a 3 mm offset to the left and right from the median palatine suture (MPS). Since an operating range of the appliance varies according to the length of a screw rod, that is, the length of the appliance, not the width of the appliance, if an appliance having a sufficiently long screw rod is used, a sufficient palatal expansion effect suitable for the treatment object may be obtained. In other words, it is possible to achieve a sufficient palatal expansion suitable for the treatment object by designing the palatal expansion appliance to be narrow and long.

2) Since the width of the appliance is narrow, even when a palate is narrow, a plurality of bone screws may be implanted within 3 mm from the MPS that is a target tissue to the left and right. Accordingly, an expansion force of the appliance may be stably transferred to the target tissue.

3) Also, since the body of the palatal expansion appliance is sufficiently accessible to a portion where the bone screw is fixed, that is, since a lever arm is shortened, generation of a twisting force reduces when the expansion force of the appliance is transferred to bones adjacent to the MPS so that a rate of disassembly of the bone screw may be reduced.

4) Since a plurality of bone screws may be provided, even when one or two bone screws are loose, a sufficient support force may be obtained from the other bone screws to expand a palate.

5) Since not entire body of the expansion appliance completely closely contacts the lower soft tissues and only a bottom portion of a tapered exit-side external structure of a bone screw hole and/or a bottom portion of a tapered protrusion of a bone screw joint contact the lower soft tissues, inflammation and pain due to unnecessary contact with portions of soft tissues other than a minimum area around a portion where the bone screw is fixed may be prevented.

6) Since an inlet of a keyhole is formed in a funnel shape, it is easy to insert a key and thus an assistant may easily expand the appliance or a user may solely insert the key into the keyhole without the assistant, thereby operating the palatal expansion appliance.

BEST MODE

In the following description, a palatal expansion appliance according to an embodiment is described in detail.

A palatal expansion appliance according to an embodiment may include a pair of bone screw joints and a driving portion.

The bone screw joints extend in one direction, and a plurality of bone screw holes are formed in the bone screw joints and may be arranged to face each other.

The driving portion may be arranged between the one pair of bone screw joints.

As at least a part of the driving portion is moved in one direction, the one pair of bone screw joints may be moved in the other direction.

As at least a part of the driving portion is moved in a vertical direction, the one pair of bone screw joints may be moved in a horizontal direction.

The palatal expansion appliance may further include a plurality of bone screws coupled to a corresponding one of the bone screw joints.

The bone screw holes may be linearly arranged and spaced apart from each other in a direction in which a corresponding one of the bone screw joints extends.

The respective corresponding bone screw joints may each have an arch-shaped bottom part having a thickness that is relatively thick at a center portion thereof and decreases toward opposite end portions thereof in the lengthwise direction thereof.

Each of the bone screw joints may have a tapered protrusion at the bottom side. For example, each of the bone screw joints may have a protrusion having a shape of a circular cone, a quadrangular pyramid, or a triangular pyramid at the bottom side, that is, at a side of soft tissues.

Each of the bone screw holes may have a tapered exit-side external structure. For example, each of the bone screw holes may have an external structure having a shape of a circular cone, a quadrangular pyramid, or a triangular pyramid at the bottom side, that is, a side of the soft tissues.

The palatal expansion appliance may further include an accessory or apparatus used to move the position of a tooth or an upper jaw bone. For example, the accessory or apparatus may be coupled to each of the bone screw joints.

The driving portion may be of a manual type or a motor-driven type.

Hereinafter, a palatal expansion appliance having a manual driving portion and a palatal expansion appliance having a motor-driven driving portion are sequentially described with reference to the accompanying drawings.

<Manual Palatal Expansion Appliance>

Figure 6A:
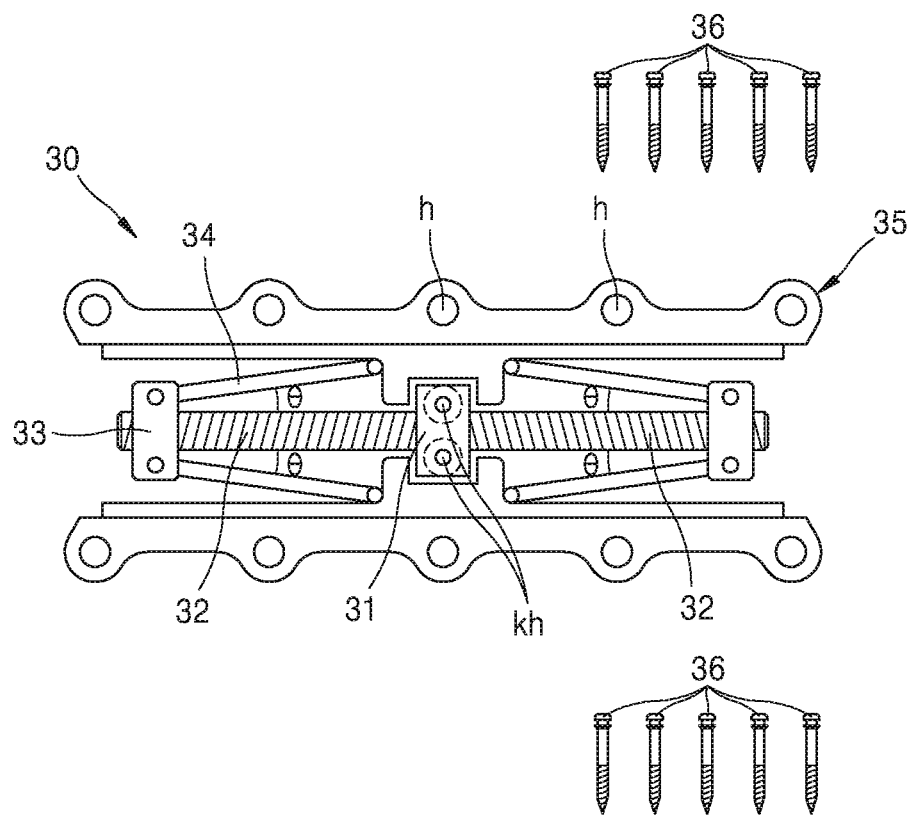
FIG. 6A is a plan view schematically illustrating a palatal expansion appliance according to an embodiment.
Figure 6B:
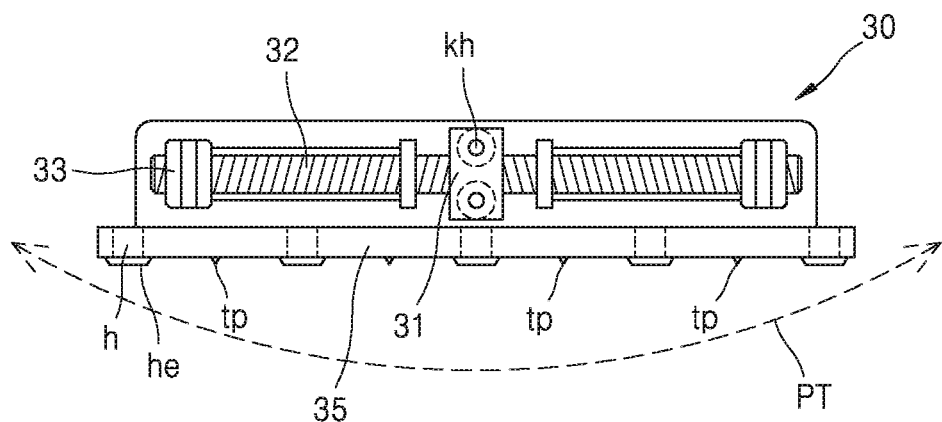
FIG. 6B is a front view schematically illustrating a palatal expansion appliance according to an embodiment.
Figure 6C:
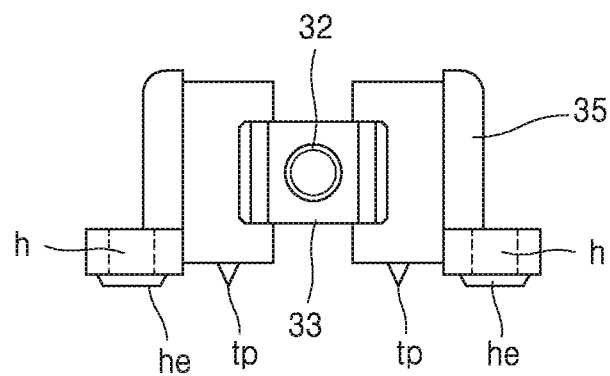
FIG. 6C is a side view schematically illustrating a palatal expansion appliance according to an embodiment.
Figure 6D:
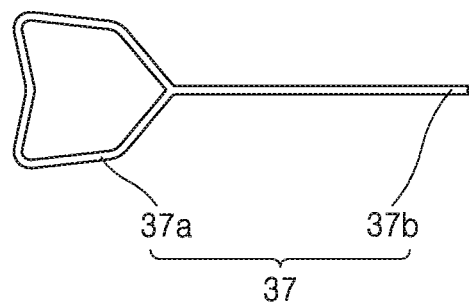
FIG. 6D schematically illustrates a key for rotating a keyhole formation portion of a palatal expansion appliance according to an embodiment.
Figure 6E:
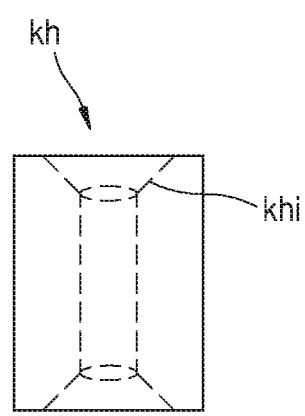
FIG. 6E schematically illustrates a keyhole having a funnel-shaped inlet in a palatal expansion appliance according to an embodiment.

FIG. 6A is a plan view of a palatal expansion appliance 30 according to an embodiment. FIG. 6B is a front view of the palatal expansion appliance of FIG. 6A. FIG. 6C is a side view of the palatal expansion appliance of FIG. 6A. FIG. 6D schematically illustrates a key 37 for rotating a keyhole formation portion 31 of the palatal expansion appliance 30 of FIG. 6A. FIG. 6E schematically illustrates a keyhole kh including a key inlet khi in a funnel shape in the palatal expansion appliance 30 of FIG. 6A.

Referring to FIG. 6A, a pair of link joints 33 are respectively screw-coupled to one end portion and the other end portion of a screw rod 32 located far from a keyhole formation portion 31. Although one end portion of each of a plurality of links 34 is illustrated to be pivotably coupled to a corresponding one of the link joints 33 and the other end portion of each of the links 34 is illustrated to be pivotably coupled to each of the one pair of bone screw joints 35 to face the keyhole formation portion 31, the present inventive concept is not limited thereto. In the palatal expansion appliance 30, each of the link joints 33 may be screw-coupled to one side or the other side of the screw rod 32 located close to the keyhole formation portion 31, and one end portion of each of the links 34 may be pivotably coupled to a corresponding one of the link joints 33 and the other end portion of each of the links 34 may be pivotally coupled to each of the bone screw joints 35 to face the one end portion or the other end portion of screw rod 32.

Referring to FIGS. 6A to 6D, the palatal expansion appliance 30 according to the present embodiment may include the keyhole formation portion 31, the screw rod 32, the one pair of link joints 33, at least one pair of links 34, the one pair of bone screw joints 35, a plurality of bone screws 36, and the key 37 for rotating the keyhole formation portion 31.

The keyhole formation portion 31 and the screw rod 32 coupled to the keyhole formation portion 31 are arranged between the one pair of bone screw joints 35 to be parallel with the one pair of bone screw joints 35, wherein the screw rod 32 has two types threads formed in opposite directions. For example, the keyhole formation portion 31 is located at the center of the screw rod 32. A first thread is located at the left side of the keyhole formation portion 31, and a second thread formed in a direction opposite to the first thread is located at the right side of the keyhole formation portion 31. The length of the first thread may be the same as the length of the second thread. The plurality of keyholes kh are formed around the keyhole formation portion 31 at a constant interval. For example, a total of four keyholes kh may be formed around the keyhole formation portion 31 at an interval of 90°, and the four keyholes kh may perpendicularly penetrate through the keyhole formation portion 31. The key 37, which is described later, is inserted into the keyhole kh, and when a force is applied to the inserted key 37 in one direction, the keyhole formation portion 31 is rotated. A rotation force of the keyhole formation portion 31 is directly transferred to the screw rod 32 that is described later.

The screw rod 32 is arranged between the one pair of bone screw joints 35 to be parallel with the one pair of bone screw joints 35. Also, when the keyhole formation portion 31 is rotated in one direction, the screw rod 32 is rotated in the same direction as a rotation direction of the keyhole formation portion 31. The screw rod 32 receives the rotation force of the keyhole formation portion 31 and re-transfers the rotation force to a female screw of a corresponding one of the link joints 33, which is described later, through a male screw of the screw rod 32. In this state, the threads of the male screw at opposite ends of the screw rod 32 are formed in opposite directions. Accordingly, when the screw rod 32 is rotated in one direction, the one pair of the link joints 33 are moved in directions toward or away from each other. Through this process, a corresponding one of the link joints 33 converts a rotation motion of the keyhole formation portion 31 transferred to the screw rod 32 to a linear motion of the link joints 33 and then transfers the force to each of the links 34.

The one pair of link joints 33 are respectively screw-coupled to the threads of two types formed on the screw rod 32. In other words, each of the link joints 33 includes a female screw that may be coupled to each of the threads of two types formed on the screw rod 32.

Furthermore, as illustrated in FIG. 6B, the centers of the screw rod 32 and the link joints 33 may be located on a first horizontal plane, whereas the entireties of the bone screw joints 35 may be located on a second horizontal plane that is lower than the first horizontal plane. In the present specification, "the second horizontal plane is lower than the first horizontal plane" signifies that, when the palatal expansion appliance 30 is installed on the palate PT, the second horizontal plane is closer to the palate PT than the first horizontal plane.

Furthermore, similar to the shape of the palate PT indicated by a dotted line in FIG. 6B, each of the bone screw joints 35 may have an arch-shaped bottom part having a thickness that is relatively thick at a center portion thereof and decreases toward opposite end portions thereof in a lengthwise direction thereof. As the shape of each of the bone screw joints 35 is more similar to the shape of a vertical section of the palate PT, when each of the bone screw joints 35 is fixed to a bone at the median palatine suture of the palate PT by the bone screws 36 to exert expansion force, a length of a lever arm between a point where the expansion force is generated and a point of a bone portion supporting the expansion force further decreases. Accordingly, the expansion force of the palatal expansion appliance 30 is stably transferred to the bone via the bone screws 36, and generation of a twisting force that may cause disassembly of the bone screws 36 may be reduced.

A base portion, that is, a surface facing the soft tissues, of each of a plurality of bone screw holes h formed in the bone screw joints 35 has a tapered exit-side external structure, in which an external structure at a side of an exit he of the bone screw hole h is downwardly tapered as illustrated in FIGS. 6B and 6C. For example, a bottom side, that is, a side toward the soft tissues, of each of the bone screw holes h may have a shape of a circular cone, a quadrangular pyramid, or a triangular pyramid. Such a shape may restrict a portion of the palatal expansion appliance 30 including the bone screw joints 35, directly contacting the soft tissues, to only an area around the bone screw holes h through which the bone screws 36 penetrate. Accordingly, the generation of inflammation and pain that may be generated as the other portions of the palatal expansion appliance 30 contact the lower soft tissues may be prevented. The above effect may also be obtained by a tapered protrusion tp, for example, a circular cone, a triangular pyramid, or a quadrangular pyramid, formed at the bottom side of the bone screw joints 35, that is, a surface toward the soft tissues.

Each of the links 34 has one end portion pivotably coupled to a corresponding one of the link joints 33 and the other end portion pivotably coupled to a corresponding one of the bone screw joints 35. For example, one end portion of each of the links 34 may be pivotably coupled to a corresponding one of the link joints 33, whereas the other end portion thereof may be pivotably coupled to a corresponding one of the bone screw joints 35 to face the keyhole formation portion 31 or an end portion of the screw rod 32. Also, an angle θ between each of the links 34 and the screw rod 32 is variable in a range between 0°~90°. Accordingly, when the keyhole formation portion 31 is rotated in one direction, the screw rod 32 is rotated in the same direction as the rotation direction of the keyhole formation portion 31, the link joints 33 are moved in directions toward or away from each other, and each of the links 34 is moved in a direction in which the angle θ with respect to the screw rod 32 increases. Each of the links 34 retransfers a horizontal movement in directions toward or away from each other and a force of the link joints 33, to act in a direction in which the bone screw joints 35 are away from each other, in which the horizontal movement and force of the link joints 33 are generated when the rotation force of the keyhole formation portion 31 is transferred to the female screw of a corresponding one of the link joints 33 via the male screw of the screw rod 32. A pair or three or more pairs of the links 34 may be provided.

Figure 4:
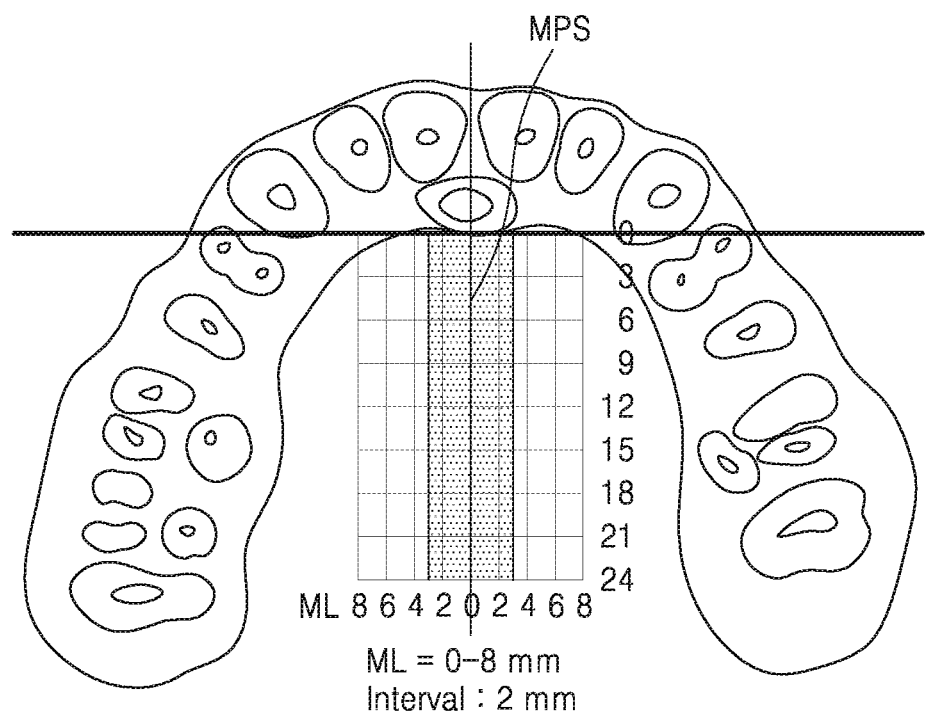
FIG. 4 illustrates a median palatine suture existing in the palate of the mouth and tissues around the median palatine suture.

The one pair of bone screw joints 35 are arranged to face each other and extend in one direction. Also, a plurality of bone screw holes h are formed in each of the one pair of bone screw joints 35. The bone screw holes h may be arranged spaced apart from each other and linearly in the direction in which a corresponding one of the bone screw joints 35 extends. Also, each of the bone screw joints 35 is coupled to one or more links 34. Accordingly, when the keyhole formation portion 31 is rotated in one direction, the screw rod 32 is rotated in the same direction as the rotation direction of the keyhole formation portion 31, a corresponding one of the link joints 33 is moved in a direction close to or away from a center of the keyhole formation portion 31, each of the links 34 pivots in a direction in which the angle θ with respect to the screw rod 32 increases, and each of the bone screw joints 35 is moved in a direction perpendicular to the lengthwise direction of the screw rod 32 to be away from the screw rod 32. Each of the bone screw joints 35 retransfers the rotation force of the keyhole formation portion 31 transferred to each of the links 34 to each of the bone screws 36 implanted in the bone of the palate. The force retransferred to each of the bone screws 36 is finally transferred to a bone (not shown) adjacent to the MPS of the palate where the bone screws 36 are implanted. Thus, the MPS of FIG. 4 is widened in opposite directions to expand the palate.

As described above, the key 37 is inserted into each of the keyholes kh and rotates the keyhole formation portion 31 in one direction. The key 37, as illustrated in FIG. 6D, may include a holding part 37*a* and an insertion part 37*b*. When a user holding the holding part 37*a* inserts the insertion part 37*b* into each of the keyholes kh and then pulls the holding part 37*a* in one direction, for example, a direction perpendicular to a lengthwise direction of the insertion part 37*b* to rotate the keyhole formation portion 31. To facilitate insertion of the key 37 into the keyhole kh, as illustrated in FIG. 6E, the key inlet khi of the keyhole kh may have a funnel shape.

Figure 7A:
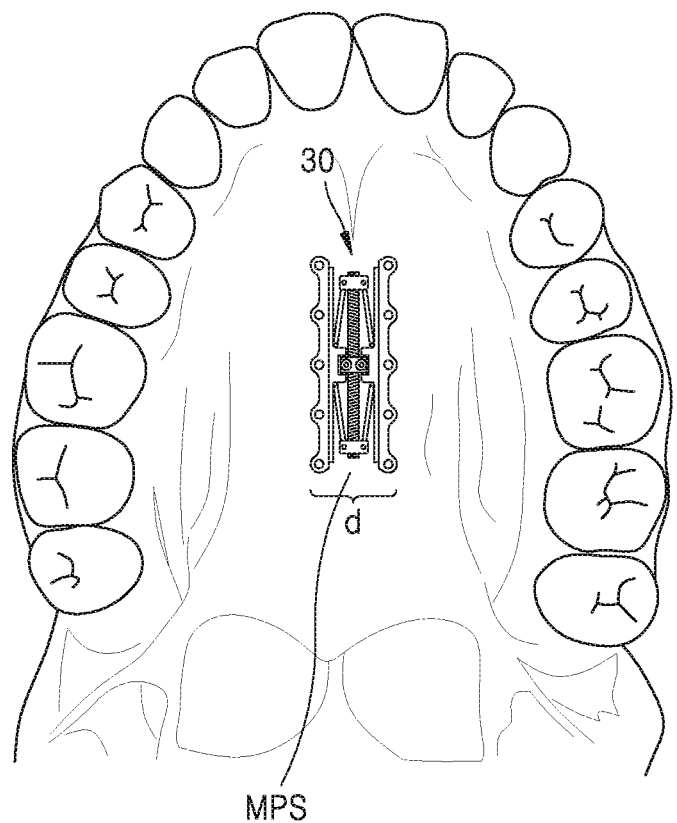
FIG. 7A is a plan view illustrating a state in which the palatal expansion appliance of FIGS. 6A to 6C is installed around a median palatine suture of a palate of a mouth.
Figure 7B:
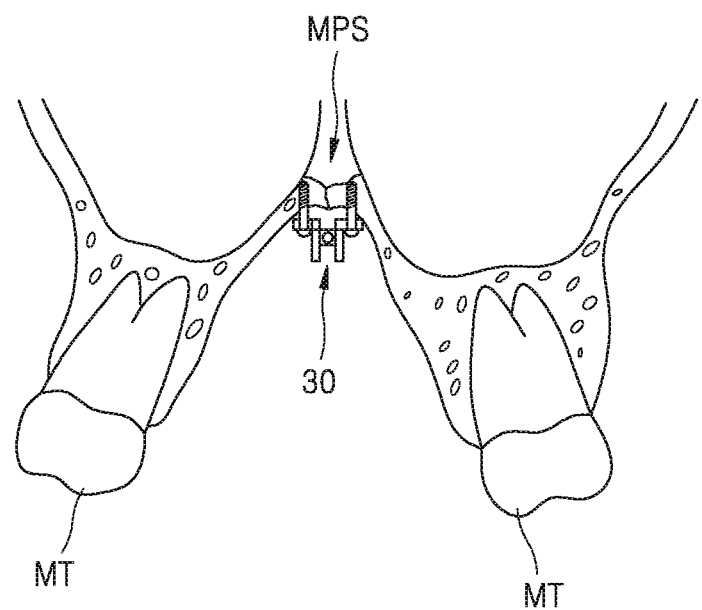
FIG. 7B is a side view illustrating a state in which the palatal expansion appliance of FIGS. 6A to 6C is installed around a median palatine suture of a palate of a mouth.

FIG. 7A is a plan view illustrating a state in which the palatal expansion appliance 30 of FIGS. 6A to 6C is installed around the MPS of a palate of a mouth. FIG. 7B is a side view illustrating a state in which the palatal expansion appliance 30 of FIGS. 6A to 6C is installed around the MPS of a palate of a mouth. In detail, the palatal expansion appliance 30 may be arranged to be symmetrical to the left and right with respect to the MPS.

Referring to FIG. 7A, the palatal expansion appliance 30 may have a sufficiently narrow width d to be easily used for a narrow palate. Also, the palatal expansion appliance 30 may be fixed in an area (see FIG. 4) within a 3 mm offset to the left and right from the MPS where appropriate bone fixing is available. Also, although the palatal expansion appliance 30 has a narrow width d, the palatal expansion appliance 30 has an expandable range of operation wider than the width d of the palatal expansion appliance 30 to be suitable for the treatment object. In the present specification, a term "minimum width of the appliance" signifies a width of the appliance before palatal expansion, whereas a term "maximum width of the appliance" signifies a width of the appliance after maximum palatal expansion.

In the palatal expansion appliance 30 according to the present embodiment, since a force transfer direction is different from those of the palatal expansion appliances 10 and 20, an expansion range of the appliance is determined by the length of the appliance, that is, the length of the screw rod 32, not the width of the appliance. Also, since the palatal expansion appliance 30 may be provided with a plurality of bone screws (ten in the case of FIG. 7A), a sufficient support force of the bone screws may be obtained when the palatal expansion appliance 30 is used to expand the palate.

Figure 1:
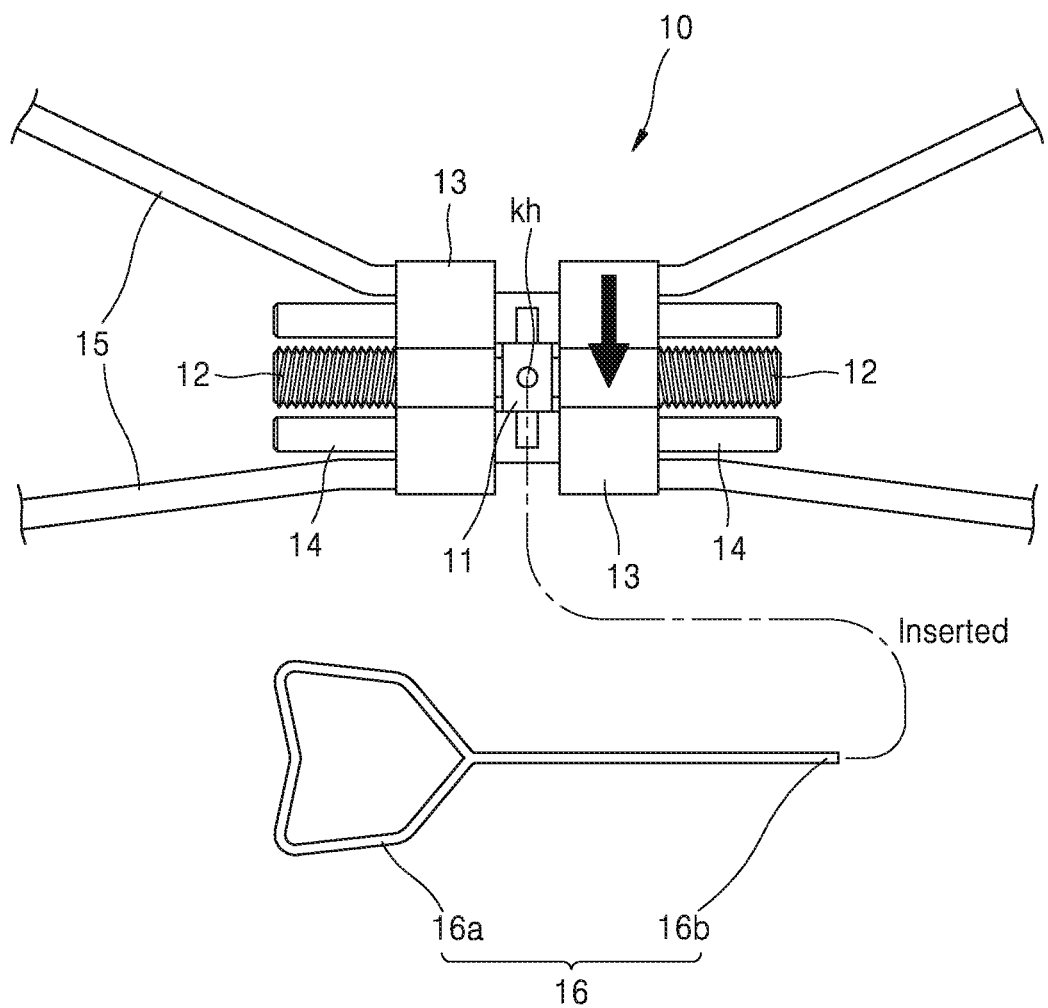
FIG. 1 schematically illustrates a palatal expansion appliance according to the related art.
Figure 2A:
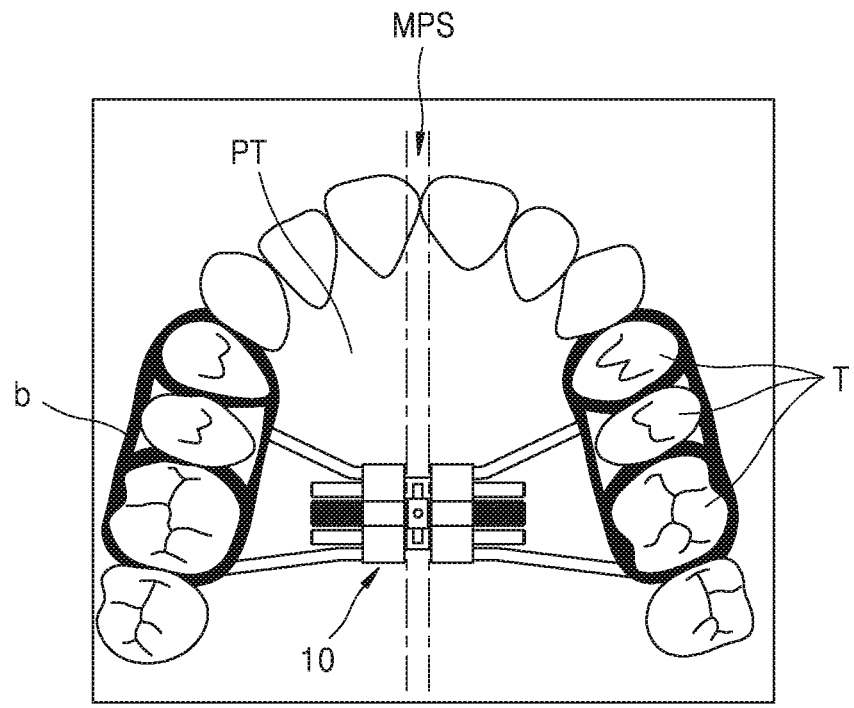
FIG. 2A is a plan view illustrating a state in which the palatal expansion appliance of FIG. 1 is installed around a palate of a mouth.
Figure 2B:
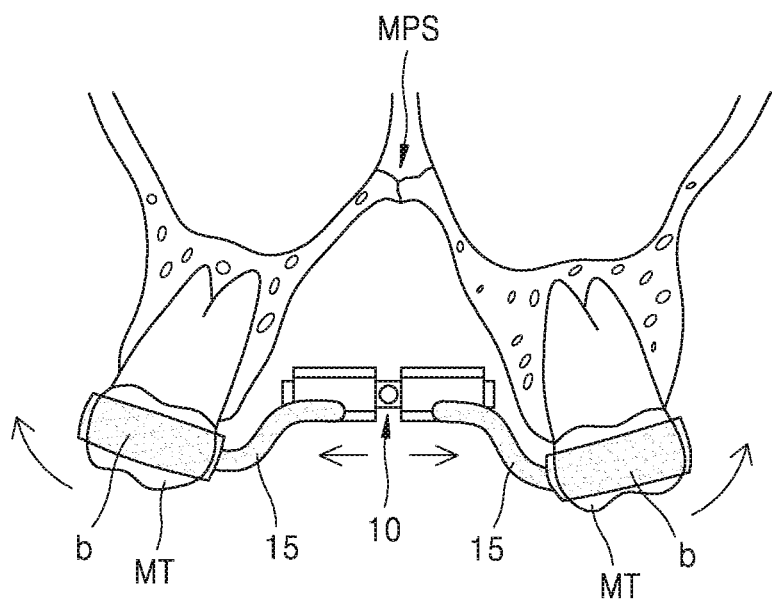
FIG. 2B is a side view illustrating a state in which the palatal expansion appliance of FIG. 1 is installed around the palate of the mouth.
Figure 3:
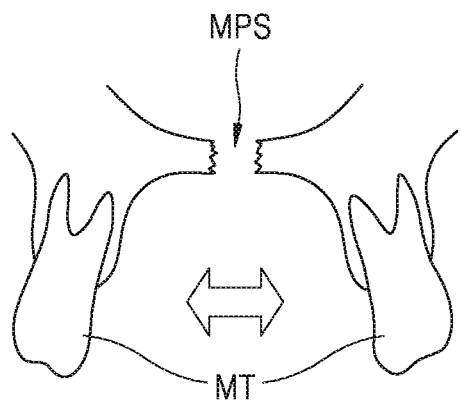
FIG. 3 illustrates a side effect of the palatal expansion appliance of FIG. 1.
Figure 5A:
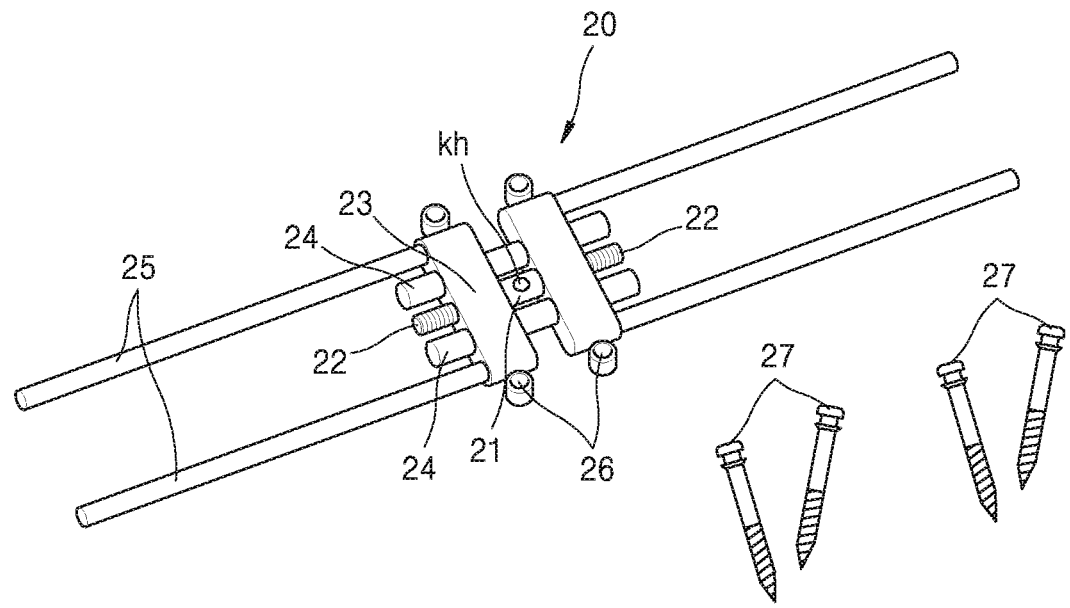
FIG. 5A is a perspective view schematically illustrating another palatal expansion appliance according to the related art.
Figure 5B:
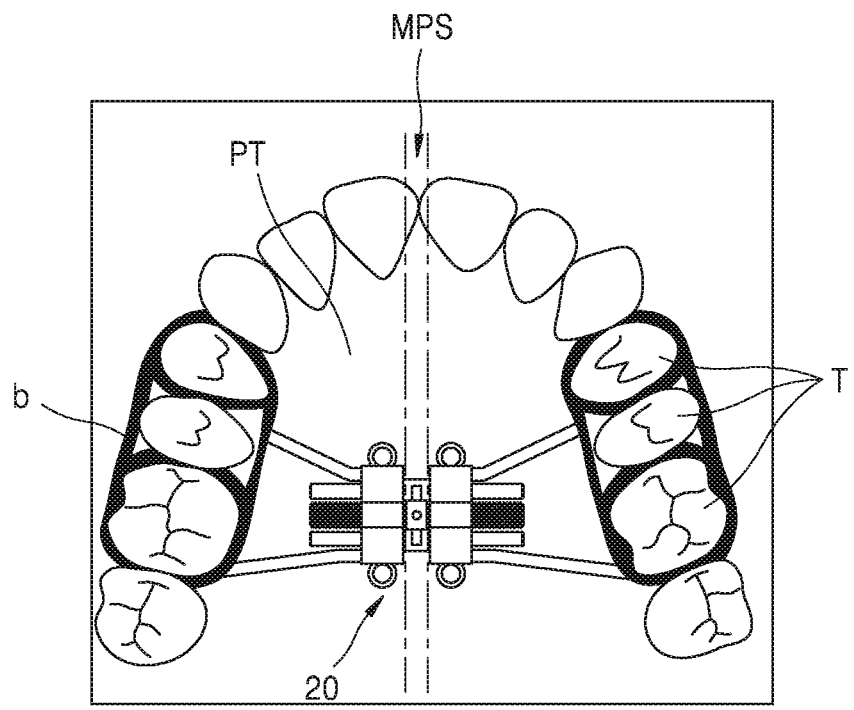
FIG. 5B is a plan view illustrating a state in which the palatal expansion appliance of FIG. 5A is installed around the palate of the mouth.
Figure 5C:
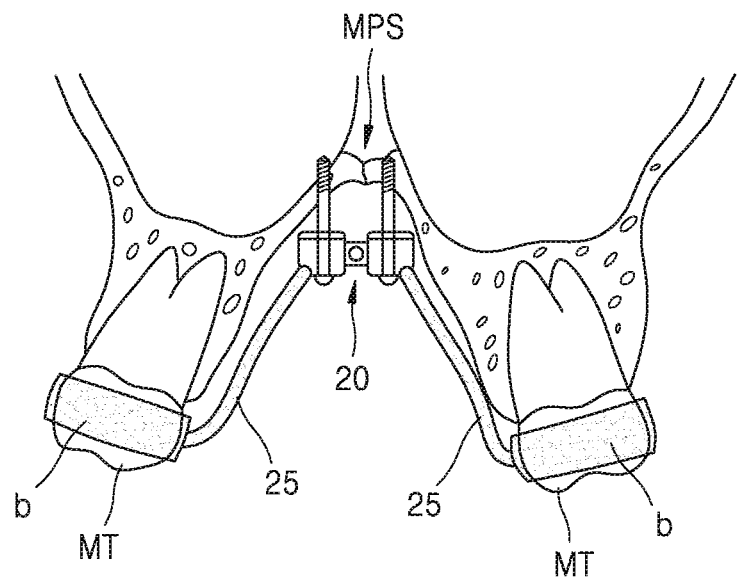
FIG. 5C is a side view illustrating a state in which the palatal expansion appliance of FIG. 5A is installed around the palate of the mouth.

Referring to FIG. 7B with FIGS. 2B and 5C, the palatal expansion appliance 30 according to the present embodiment may have a narrow width compared to that of the palatal expansion appliances 10 and 20 according to the related art to be easily installed and have a wide expansion range in spite of the narrow width thereof. Also, since the distance between the palatal expansion appliance 30 and the bone is close, the bone screws 36 may be prevented from being disassembled due to the generation of a twisting force. In addition, a sufficient palatal expansion effect may be obtained without applying a force to the molar teeth MT.

The driving portion provided in the palatal expansion appliance 30 may move the one pair of bone screw joints 35 such that a gap between the bone screw joints 35 at one side is greater than a gap between the bone screw joints 35 at the other side. In this case, the screw rod 32 may include threads of two types formed in opposite directions and having different inclinations (ie., angles) and pitches. Also, in this case, the one pair of link joints 33 may include female threads having different inclinations and pitches.

Hereinafter, a modified example of the palatal expansion appliance 30 according to a present embodiment is briefly described.

In a modified example of the palatal expansion appliance 30, the insertion part 37*b* is omitted from the palatal expansion appliance 30 and a wrench bolt (not shown) is arranged at one end portion of the screw rod 32 and there is provided a wrench (not shown) for rotating the wrench bolt by inserting the wrench bolt therein. In other words, in the modified example of the palatal expansion appliance 30, instead of rotating the screw rod 32 by inserting the key 37 into the keyhole kh of the keyhole formation portion 31 of the palatal expansion appliance 30, the screw rod 32 is rotated around the major axis at one end portion of the screw rod 32 by rotating the wrench bolt, for example, a hexagonal or rectangular structure, formed at the one end portion of the screw rod 32 by using the wrench having a female screw.

<Motor-Driven Palatal Expansion Appliance>

Figure 8A:
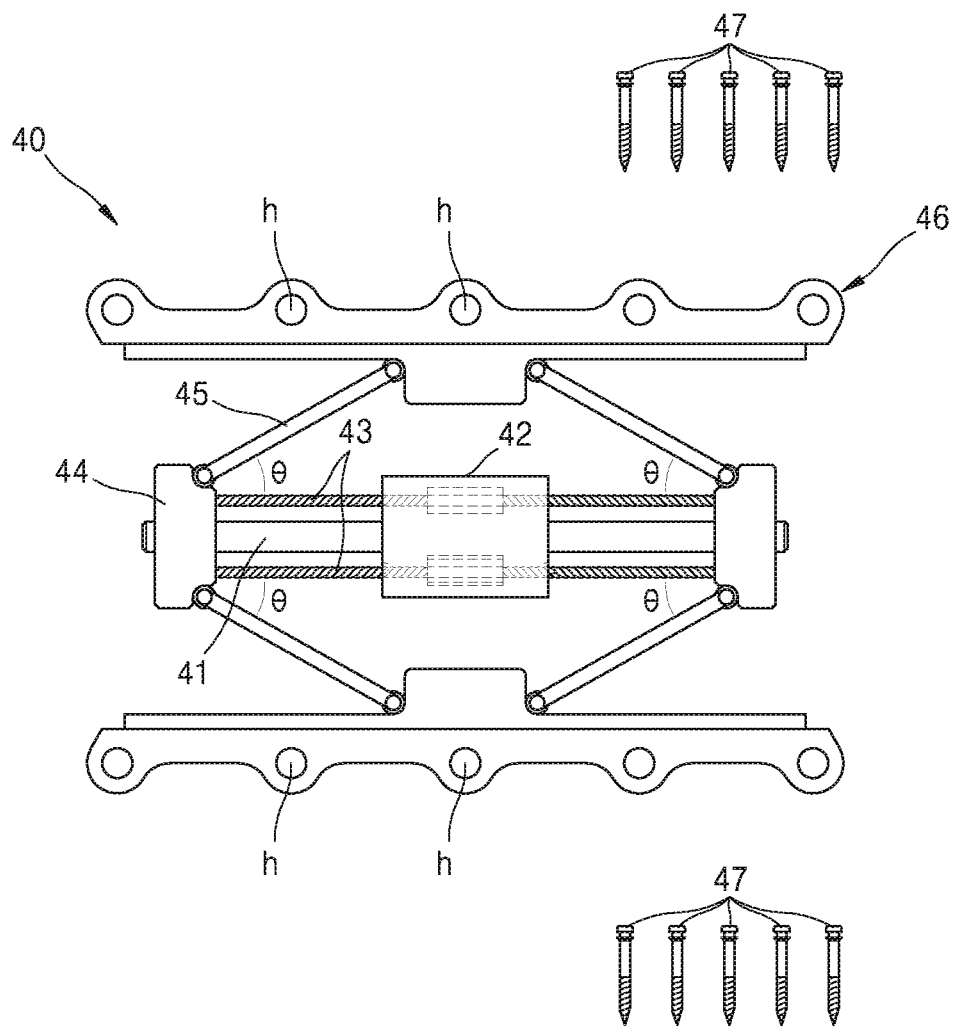
FIG. 8A is a plan view schematically illustrating a palatal expansion appliance according to another embodiment.
Figure 8B:
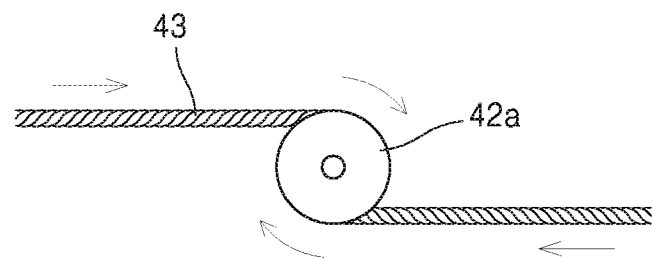
FIG. 8B illustrates an operating principle of the palatal expansion appliance of FIG. 8A.

FIG. 8A is a plan view schematically illustrating a palatal expansion appliance 40 according to another embodiment. FIG. 8B illustrates an operating principle of the palatal expansion appliance 40 of FIG. 8A.

Referring to FIGS. 8A and 8B, the palatal expansion appliance 40 may include a guide rod 41, a pair of link joints 44, a motor 42, a rotating wheel 42*a*, a pair of wires 43, at least one pair of links 45, a pair of bone screw joints 46, and a plurality of bone screws 47.

The palatal expansion appliance 40 of FIG. 8A is different from the palatal expansion appliance 30 of FIG. 6A in terms of the structure and operating principle of the driving portion. Hereinafter, the palatal expansion appliance 40 of FIG. 8A is described in detail mainly regarding the difference compared to the palatal expansion appliance 30 of FIG. 6A. Any portions that are not described with respect to the palatal expansion appliance 40 of FIG. 8A may be considered to be the same as those of the palatal expansion appliance 30 of FIG. 6A.

The driving portion provided in the palatal expansion appliance 40 of FIG. 8A may include the guide rod 41, the one pair of link joints 44, the motor 42, the rotating wheel 42a, the one pair of wires 43, and the at least one pair of links 45.

The guide rod 41 is arranged between the one pair of bone screw joints 46 to be parallel with the bone screw joints 46.

The one pair of link joints 44 are respectively coupled to one end portion and the other end portions of the guide rod 41.

The motor 42 is coupled to the guide rod 41 and may include a motor drive shaft (not shown). The motor 42 may be a single motor or a motor module including two motors, as illustrated in FIG. 8A.

The rotating wheel 42a is coupled to the motor drive shaft. When the motor 42 is a motor module including two motors, the palatal expansion appliance 40 may include two rotating wheels 42a, as illustrated in FIG. 8A.

Each of the wires 43 has one end portion coupled to a corresponding one of the link joints 44 and the other end portion movably coupled to the rotating wheel 42a. When two motors 42 and two rotating wheels 42a are provided, as illustrated in FIG. 8A, two pairs of the wires 43 may be provided. In other words, one pair of the wires 43 may be movably coupled to one of the rotating wheels 42a, and the other pair of the wires 43 may be movably coupled to the other one of the rotating wheels 42a.

Each of the links 45 has one end portion pivotably coupled to a corresponding one of the link joints 44 and the other end portion pivotably coupled to a corresponding one of the bone screw joints 46.

In the palatal expansion appliance 40 configured as above, when the rotating wheel 42a is rotated in one direction by a rotation force of the motor drive shaft, each of the wires 43 is wound around the rotating wheel 42a and moved toward the rotating wheel 42a, and the one pair of link joints 44 are moved in direction toward or away from each other. Then, each of the links 45 pivots in a direction in which the angle θ with respect to each of the wires 43 increases, and each of the bone screw joints 46 is moved in a direction perpendicular to a lengthwise direction of the guide rod 41 to be away from the guide rod 41.

The driving portion, as illustrated in FIG. 8A, may further include an additional rotating wheel 42a and a pair of additional wires 43.

The additional rotating wheel 42a is coupled to the motor drive shaft to be parallel with the rotating wheel 42a.

Each of the additional pair of wires 43 has one end portion coupled to a corresponding one of the link joints 44 and the other end portion movably coupled to the additional rotating wheel 42a.

At least one of the rotating wheel 42a and the additional rotating wheel 42a may include one pair of sub rotating wheels (not shown) having different diameters. One end portion of each of the wires 43 and the additional pair of wires 43 is coupled to a corresponding one of the link joints 44, whereas the other end portion thereof is movably coupled to a corresponding one of the one pair of sub rotating wheels. The driving portion may move the one pair of bone screw joints 46 such that a gap between the bone screw joints 46 at one side is greater than a gap between the bone screw joints 46 at the other side.

Figure 9A:
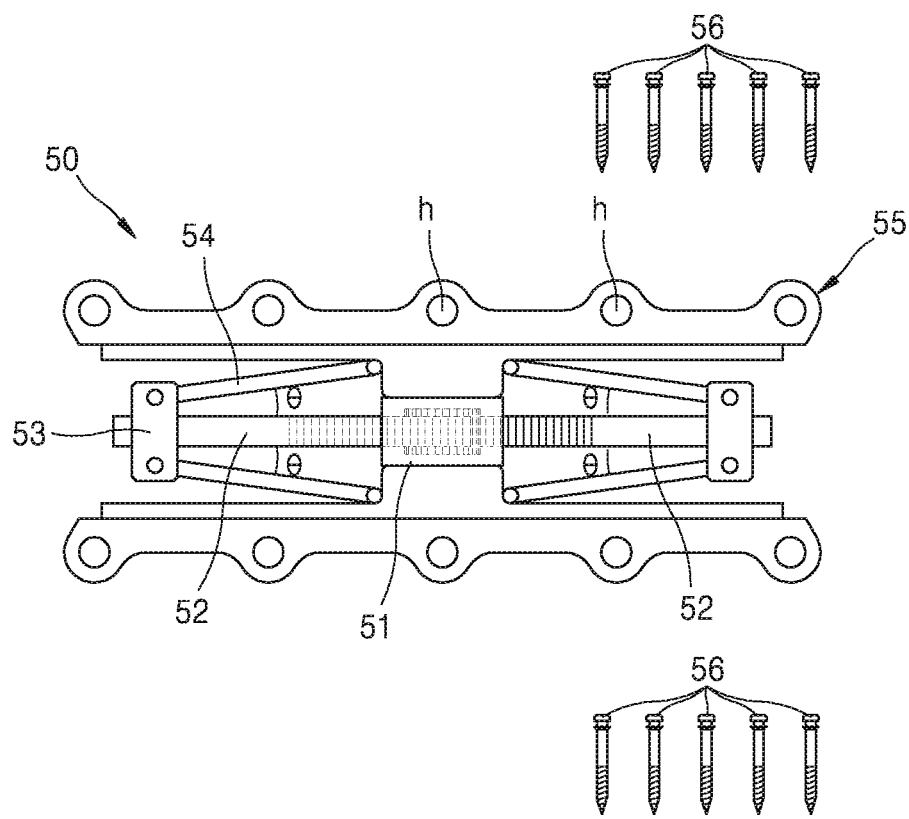
FIG. 9A is a plan view schematically illustrating a palatal expansion appliance according to another embodiment.
Figure 9B:
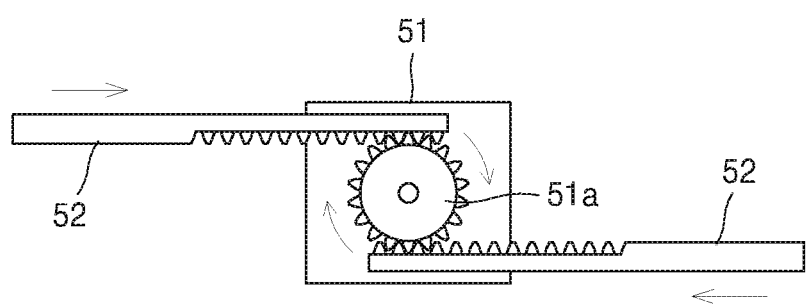
FIG. 9B illustrates an operating principle of the palatal expansion appliance of FIG. 9A.
Figure 10A:
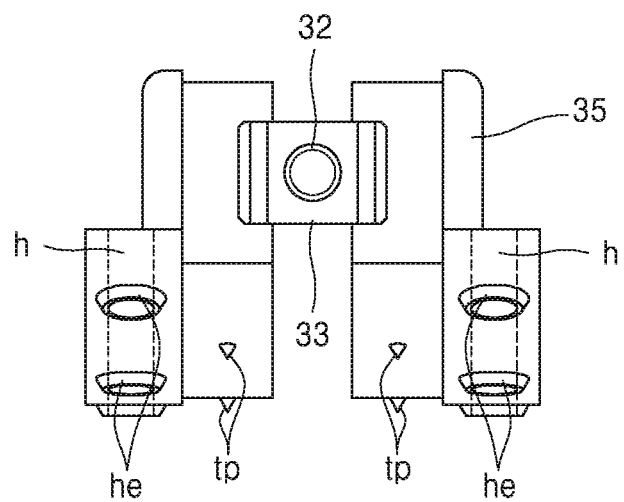
FIG. 10A is a front view schematically illustrating a palatal expansion appliance according to another embodiment.
Figure 10B:
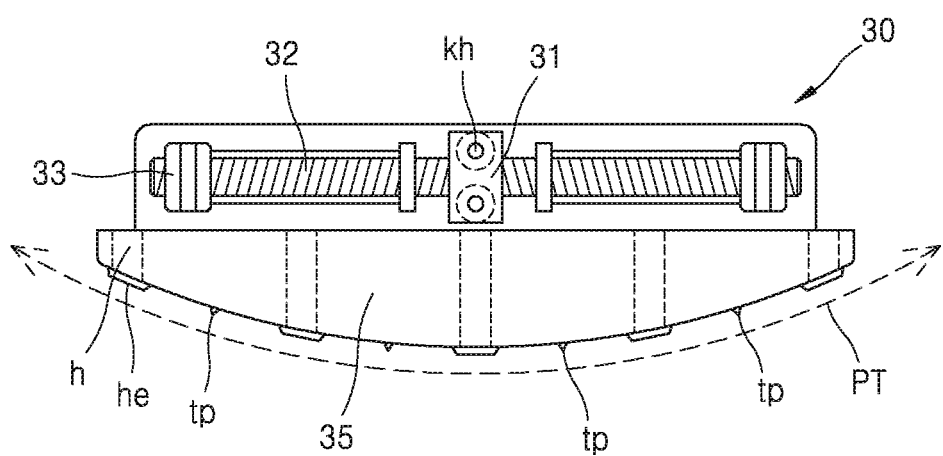
FIG. 10B is a side view schematically illustrating the palatal expansion appliance shown in FIG. 10A.

FIG. 9A is a plan view schematically illustrating a palatal expansion appliance 50 according to another embodiment. FIG. 9B illustrates an operating principle of the palatal expansion appliance 50 of FIG. 9A.

Referring to FIGS. 9A and 9B, the palatal expansion appliance 50 may include a motor 51, a rotating gear 51a, a pair of linear motion units 52, a pair of link joints 53, at least one pair of links 54, a pair of bone screw joints 55, and a plurality of the bone screws 56.

The link joints 53 may be omitted. In this case, the links 54 may be pivotably coupled directly to a corresponding one of the linear motion units 52.

The palatal expansion appliance 50 of FIG. 9A is different from the palatal expansion appliance 30 of FIG. 6A in terms of the structure and operating principle of the driving portion. Hereinafter, the palatal expansion appliance 50 of FIG. 9A is described in detail mainly regarding the difference compared to the palatal expansion appliance 30 of FIG. 6A. Any portions that are not described with respect to the palatal expansion appliance 50 of FIG. 9A may be considered to be the same as those of the palatal expansion appliance 30 of FIG. 6A.

The driving portion included in the palatal expansion appliance 50 of FIG. 9A may include the motor 51, the rotating gear 51a, the one pair of linear motion units 52, the one pair of link joints 53, and the at least one pair of links 54. As described above, the link joints 53 may be omitted. The motor 51 is arranged between the one pair of bone screw joints 55 and may include a motor drive shaft.

The rotating gear 51a is coupled to the motor drive shaft.

The one pair of linear motion units 52 are arranged between the one pair of bone screw joints 55 to be parallel with the bone screw joints 55. The one pair of linear motion units 52 have gear teeth formed at one side in opposite directions and are gear-coupled to the rotating gear 51a.

Each of the links 54 includes one end portion pivotably coupled to a corresponding one of the link joints 53 or a corresponding one of the linear motion units 52 and the other end pivotably coupled to a corresponding one of the bone screw joints 55.

In the palatal expansion appliance 50, when the rotating gear 51a is rotated in one direction by a rotation force of the motor drive shaft, the linear motion units 52 are moved in directions toward or away from the motor 51. Each of the links 54 pivots in a direction in which the angle θ with respect to a corresponding one of the linear motion units 52 increases. Each of the bone screw joints 55 is moved in a direction perpendicular to a lengthwise direction of the linear motion units 52 to be away from the linear motion units 52.

The rotating gear 51a may include one pair of sub rotating gears (not shown) having different gear ratios. Each of the linear motion units 52 is gear-coupled to each of the one pair of sub rotating gears. The driving portion may move the one pair of bone screw joints 55 such that a gap between the bone screw joints 55 at one side is greater than a gap between the bone screw joints 55 at the other side.

While the present inventive concept has been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the present inventive concept as defined by the following claims.

LIST OF REFERENCE NUMERALS

| | |
|---|---|
| 30, 40, 50: palatal expansion appliance | 31: keyhole formation portion |
| 32: screw rod | 33, 44, 53: link joint |
| 34, 45, 54: link | 35, 46, 55: bone screw joint |
| 36, 47, 56: bone screw | 37: key |
| 37a: holding part | 37b: insertion part |
| 41: guide rod | 42, 51: motor |
| 42a: rotating wheel | 43: wires |
| 51a: rotating gear | 52: linear motion unit |
| kh: keyhole | h: bone screw hole |
| tp: protrusion | |

The invention claimed is:

1. A palatal expansion appliance comprising:
a pair of bone screw joints comprising a first bone screw joint and a second bone screw joint arranged to face each other and, each of the first and the second bone screw joints having at least three bone screw holes formed thereon and extending in a direction parallel to a median palatine suture (MPS) such that the palatal expansion appliance is arranged in parallel to the MPS; and
a driving portion arranged between the first and the second bone screw joints,
wherein, as at least a part of the driving portion is moved in one direction, the first and the second bone screw joints are moved in another direction;
wherein the width of the appliance is designed to fix the palatal expansion appliance on bones within 3 mm offsets to the left and right from a center line of the median palatine suture (MPS), and the width of the appliance corresponds to a distance between one center line of at least three bone screw holes on the first bone screw joint and the other center line of at least three bone screw holes on the second bone screw joint, upon penetration of at least six bone screws through the bone screw holes into the bones;
wherein the driving portion comprises a screw rod arranged between the first and the second bone screw joints and to be parallel with the first and the second bone screw joints and
wherein the screw rod includes threads of two types formed thereon and a first part extending to one end thereof and a second part extending to another end thereof which is opposite to the one end,
a first type of thread formed on the first part of the screw rod and turning toward the one end and
a second type of thread formed on the second part of the screw rod and turning toward another end such that turning of the second type of thread is an opposite direction to turning of the first type of thread,
wherein the screw rod comprises a keyhole formation portion located between the first part and the second part of the screw rod.

2. The palatal expansion appliance of claim 1, wherein the first and the second bone screw joints are moved in a direction perpendicular to a lengthwise direction of the screw rod, away from the screw rod.

3. The palatal expansion appliance of claim 1, further comprising a first group of bone screws coupled to the first bone screw joint and a second group of bone screws coupled to the second bone screw joint.

4. The palatal expansion appliance of claim 1, wherein each of the first and the second bone screw joints has at least three bone screw holes formed thereon; and the at least three bone screw holes are arranged linearly and spaced apart from each other in the direction in which the first and the second bone screw joints extend.

5. The palatal expansion appliance of claim 1, wherein the first bone screw joint has an arch-shaped bottom part having a thickness that is thickest at a center portion of the arch-shaped bottom part and decreases toward opposite end portions of the arch-shaped bottom part in a lengthwise direction of the first bone screw joint.

6. The palatal expansion appliance of claim 1, wherein each of the one pair of bone screw joints has a tapered protrusion at a bottom side.

7. The palatal expansion appliance of claim 1, wherein each of the at least three bone screw holes has a tapered exit-side external structure.

8. The palatal expansion appliance of claim 1, wherein the driving portion moves the pair of bone screw joints such that a gap between the pair of bone screw joints at one side is greater than a gap between the pair of bone screw joints at another side.

9. The palatal expansion appliance of claim 1, wherein the driving portion is manually driven or motor-driven.

10. The palatal expansion appliance of claim 1, wherein the driving portion further comprises:
a pair of link joints respectively screw-coupled to the threads of the two types formed on the screw rod; and
at least one pair of links, each pair of links configured to be pivotably connected to the pair of link joints and the pair of bone screw joints.

11. The palatal expansion appliance of claim 10, wherein an angle between each of the pair of links and the screw rod is variable in a range of about 0° to 90°.

12. The palatal expansion appliance of claim 10, wherein a plurality of keyholes are formed around the keyhole formation portion at a constant interval.

13. The palatal expansion appliance of claim 12, wherein the plurality of keyholes are formed around the keyhole formation portion at an interval of about 90°.

14. The palatal expansion appliance of claim 12, wherein each of the plurality of keyholes has an inlet which is funnel shaped.

15. The palatal expansion appliance of claim 12, further comprising a key rotating the keyhole formation portion,
wherein the key is inserted into each of the plurality of keyholes and rotates the keyhole formation portion in one direction.

16. The palatal expansion appliance of claim 12, wherein when the keyhole formation portion is rotated in a rotation direction,
the screw rod is rotated in the same direction as the rotation direction of the keyhole formation portion,
the pair of link joints are moved in a direction toward, or alternatively, away from a center of the keyhole formation portion,
each of the pair of links pivots in a direction in which an angle with respect to the screw rod increases, and
the first and the second bone screw joints are moved in a direction perpendicular to a lengthwise direction of the screw rod, away from the screw rod.

17. The palatal expansion appliance of claim 10, wherein the driving portion moves the first and the second bone screw joints such that a gap between the first and the second bone screw joints at one side is greater than a gap between the first and the second bone screw joints at another side.

18. A palatal expansion appliance comprising:
one pair of bone screw joints arranged to face each other, each of the one pair of bone screw joints extending in one direction and having at least three bone screw holes formed thereon; and
a driving portion arranged between the one pair of bone screw joints,
wherein, as at least a part of the driving portion is moved in one direction, the one pair of bone screw joints are moved in another direction,
wherein the width of the appliance is designed to fix the palatal expansion appliance on bones within 3 mm offsets to the left and right from the median palatine suture (MPS),
wherein the driving portion comprises a guide rod arranged between the one pair of bone screw joints to be parallel with the one pair of bone screw joints;
one pair of link joints respectively coupled to one end portion and another end portion of the guide rod;
a motor coupled to the guide rod and comprising a motor drive shaft;
a rotating wheel coupled to the motor drive shaft;
one pair of wires, each of the one pair of wires having one end portion coupled to a corresponding one of the one pair of link joints and another end portion movably coupled to the rotating wheel; and
at least one pair of links, each of the at least one pair of links having one end portion pivotably coupled to a corresponding one of the one pair of the link joints and another end portion pivotably coupled to a corresponding one of the one pair of bone screw joints.

19. The palatal expansion appliance of claim 18, being configured such that, when the rotating wheel is rotated in a rotation direction by a rotation force of the motor drive shaft, each of the one pair of wires is wound around the rotating wheel and moved toward the rotating wheel, the one pair of link joints are moved in directions toward or away from each other, each of the at least one pair of links pivots in a direction in which an angle with respect to each of the one pair of wires increases, and each of the one pair of bone screw joints is moved in a direction perpendicular to a lengthwise direction of the guide rod, away from the guide rod.

20. The palatal expansion appliance of claim 18, wherein the driving portion further comprises:
an additional rotating wheel coupled to the motor drive shaft; and
one pair of additional wires, each of the one pair of additional wires having one end portion coupled to a corresponding one of the one pair of link joints and another end portion movably coupled to the additional rotating wheel.

21. The palatal expansion appliance of claim 18, wherein at least one of the rotating wheel and the additional rotating wheel comprises one pair of sub rotating wheels having different diameters, each of the one pair of wires or the one pair of additional wires comprises one end portion coupled to a corresponding one of the one pair of link joints and the other end portion movably coupled to a corresponding one of the one pair of sub rotating wheels, and the driving portion moves the one pair of bone screw joints such that a gap between the one pair of bone screw joints at one side is greater than a gap between the one pair of bone screw joints at another side.

22. A palatal expansion appliance comprising:
one pair of bone screw joints arranged to face each other, each of the one pair of bone screw joints extending in one direction and having at least three bone screw holes formed thereon; and
a driving portion arranged between the one pair of bone screw joints,
wherein, as at least a part of the driving portion is moved in one direction, the one pair of bone screw joints are moved in another direction,
wherein the width of the appliance is designed to fix the palatal expansion appliance on bones within 3 mm offsets to the left and right from the median palatine suture (MPS),
wherein the driving portion comprises a motor arranged between the one pair of bone screw joints and comprising a motor drive shaft;
a rotating gear coupled to the motor drive shaft;
one pair of linear motion units arranged between the one pair of bone screw joints to be parallel with the one pair of bone screw joints, having gear teeth formed at one side in opposite directions, and gear-coupled to the rotating gear; and
at least one pair of links, each of the one pair of links having one end portion pivotably coupled to each of the one pair of linear motion units and another end portion pivotably coupled to a corresponding one of the one pair of bone screw joints.

23. The palatal expansion appliance of claim 22, being configured such that, when the rotating gear is rotated in a rotation direction by a rotation force of the motor drive shaft, the one pair of linear motion units are moved in a direction toward or away from the motor, each of the one pair of links pivots in a direction in which an angle with respect to a corresponding one of the one pair of linear motion units increases, and each of the one pair of bone screw joints is moved in a direction perpendicular to a lengthwise direction of the linear motion units, away from the linear motion units.

24. The palatal expansion appliance of claim 22, wherein, in the driving portion, the rotating gear comprises one pair of sub rotating gears having different gear ratios, the one pair of linear motion units are respectively gear-coupled to each of the one pair of sub rotating gears, and the driving portion moves the one pair of bone screw joints such that a gap between the one pair of bone screw joints at one side is greater than a gap between the one pair of bone screw joints at another side.

* * * * *